(12) United States Patent
Garrett et al.

(10) Patent No.: US 11,716,354 B2
(45) Date of Patent: Aug. 1, 2023

(54) DETERMINATION OF COMPLIANCE WITH SECURITY TECHNICAL IMPLEMENTATION GUIDE STANDARDS

(71) Applicant: Raytheon Company, Waltham, MA (US)

(72) Inventors: Austin D. Garrett, Melbourne Beach, FL (US); Jacob Cole, Coppell, TX (US); Stephen Austin Cline, The Colony, TX (US)

(73) Assignee: Raytheon Company, Waltham, MA (US)

( * ) Notice: Subject to any disclaimer, the term of this patent is extended or adjusted under 35 U.S.C. 154(b) by 169 days.

(21) Appl. No.: 16/719,669

(22) Filed: Dec. 18, 2019

(65) Prior Publication Data

US 2021/0194929 A1 Jun. 24, 2021

(51) Int. Cl.
| | | |
|---|---|---|
| *H04L 9/40* | (2022.01) | |
| *G06F 21/62* | (2013.01) | |
| *G06F 21/57* | (2013.01) | |
| *H04L 41/052* | (2022.01) | |

(52) U.S. Cl.
CPC ............ *H04L 63/20* (2013.01); *G06F 21/572* (2013.01); *G06F 21/6218* (2013.01); *H04L 41/052* (2022.05); *G06F 2221/2141* (2013.01)

(58) Field of Classification Search
CPC ... H04L 63/20; H04L 41/0206; G06F 21/572; G06F 21/6218; G06F 2221/2141
See application file for complete search history.

(56) References Cited

U.S. PATENT DOCUMENTS

| | | | | |
|---|---|---|---|---|
| 10,360,408 B1* | 7/2019 | Kincaid | ................ | G06F 21/577 |
| 10,656,953 B1* | 5/2020 | Vasudevan | ............ | G06F 9/4405 |
| 11,102,251 B1* | 8/2021 | Pettit | ..................... | H04L 63/205 |
| 2010/0058114 A1* | 3/2010 | Perkins | ................. | G06Q 10/06 |
| | | | | 714/39 |
| 2015/0193629 A1* | 7/2015 | Hajost | .................. | H04L 9/0861 |
| | | | | 713/189 |
| 2015/0213268 A1* | 7/2015 | Nance | ................... | G06F 21/577 |
| | | | | 726/1 |
| 2018/0053132 A1* | 2/2018 | Daugherty | ............. | G06Q 10/20 |
| 2018/0091558 A1* | 3/2018 | Daugherty | ............ | G06F 21/577 |
| 2018/0121658 A1* | 5/2018 | Ross | ..................... | G06F 21/577 |
| 2020/0084105 A1* | 3/2020 | Hajost | ................ | H04L 41/0894 |
| 2020/0119983 A1* | 4/2020 | D'Onofrio | .......... | H04L 41/5054 |
| 2021/0110044 A1* | 4/2021 | Price | ..................... | G06F 21/577 |

* cited by examiner

*Primary Examiner* — Jason Chiang

(57) ABSTRACT

A technology is described for determining compliance with security technical implementation guide (STIG) standards. An example of the technology can include identifying a STIG standard that may be applicable to a system component included in a computer system. The STIG standard can be obtained from a security technical implementation guide which specifies security standards for securing computer systems against unauthorized access. A configuration compliance package can be generated to evaluate a configuration setting of the system component for compliance to the STIG standard, and the configuration compliance package can be output to enable a determination of compliance of the configuration setting with the STIG standard.

19 Claims, 5 Drawing Sheets

DETERMINATION OF COMPLIANCE WITH SECURITY TECHNICAL IMPLEMENTATION GUIDE STANDARDS

BACKGROUND

During the lifecycle of an information system, many security controls can be implemented to address types of risks that affect the overall security posture of the information system. Risk can be categorized at a high level as infrastructure risks, project risks, application risks, information asset risks, business continuity risks, outsourcing risks, external risks and strategic risks. Infrastructure risks focus on the reliability of computers and networking equipment. Project risks focus on budget, timeline, and system quality. Application risks focus on performance and overall system capacity. Information asset risks focus on the damage, loss, or disclosure to an unauthorized part of information assets. Business continuity risks focus on maintaining a reliable system with maximum up-time. Outsourcing risks focus on the impact of third party suppliers meeting their requirements. External risks are items outside the information system control that impact the security of the system. Strategic risks focuses on the need of information system functions to align with the business strategy that the system supports. These risks can be addressed by implementing security standards used to harden information systems, such as those described in a security technical implementation guide (STIG). A STIG is a cybersecurity methodology for standardizing security protocols within networks, servers, computers, and logical designs to enhance overall security. When implemented, security standards specified in the STIG enhance security for software, hardware, physical and logical architectures in order to reduce vulnerabilities associated with unauthorized access to information systems.

Figure 1:
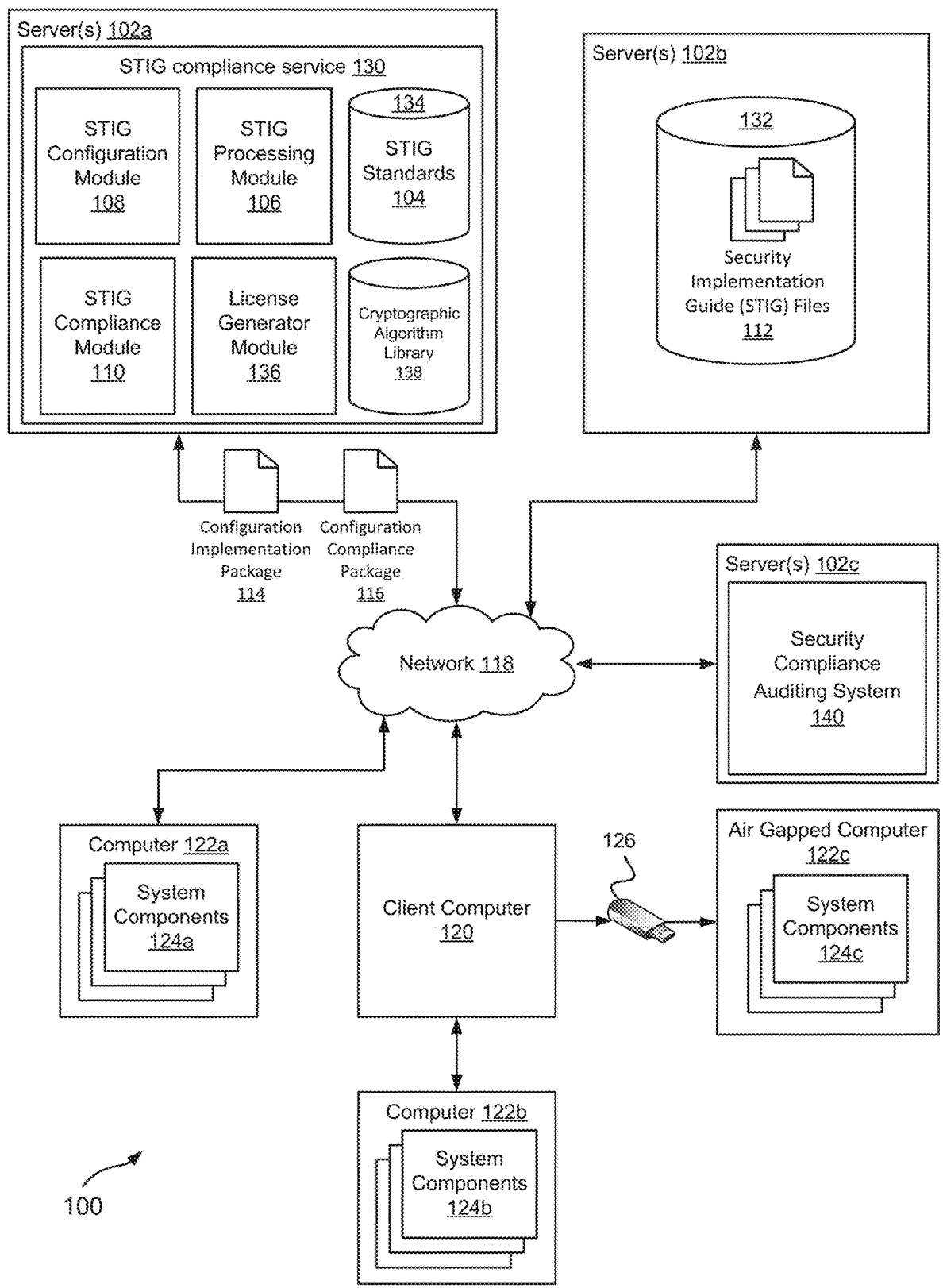
FIG. 1 is a block diagram illustrating an example system for obtaining, implementing, and determining compliance with STIG standards.

Reference will now be made to the exemplary embodiments illustrated, and specific language will be used herein to describe the same. It will nevertheless be understood that no limitation of the scope of the invention is thereby intended.

DETAILED DESCRIPTION

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for determining compliance with security technical implementation guide (STIG) standards. The technology utilizes security standards developed and provided by various organizations, such as the National Institute of Standards and Technology (NIST), which is a unit of the United States Commerce Department, and the Defense Information Systems Agency (DISA). These organizations and other organizations may provide STIGs for standardizing security protocols within networks, servers, computers, and logical designs to enhance overall security. These guides, when implemented, can enhance security for software, hardware, physical and logical architectures to reduce vulnerabilities associated with unauthorized access to computer systems. STIG standards can be obtained from a STIG, and the STIG standards can be implemented on a computer system. A compliance check can be performed to evaluate compliance with the STIG standards.

In one example of the technology, a STIG compliance service may be used to evaluate computer systems for compliance with STIG standards. The STIG compliance service may be configured to generate a configuration compliance package containing one or more computer scripts that evaluate configuration settings of one or more system components (e.g., operating system, software application, firmware, programmable computer hardware, etc.) of a particular computer system to determine whether the values of the configuration settings correspond to STIG standards for the system components. A configuration compliance package can be generated to include a computer script to evaluate a configuration setting of a particular system component (e.g., an operating system, software application, etc.), or the configuration compliance package can be generated to include multiple computer scripts to evaluate configuration settings of multiple components included in a computer system (e.g., a first computer script to evaluate an operating system configuration setting and a second computer script to evaluate an application configuration setting).

After generating a configuration compliance package to evaluate configuration settings of a computer system, the configuration compliance package can be deployed to the computer system, and the configuration compliance package can be executed on the computer system to determine compliance of the configuration settings with the STIG standard. In one example, the configuration compliance package can be loaded onto a portable storage medium, such as a portable storage device, and the configuration compliance package can be transferred from the portable storage medium to a computing device that hosts the computer system. In another example, the configuration compliance package can be transferred over a computer network to a computing device that hosts the computer system. A configuration compliance package can be configured to output a compliance report that indicates whether the configuration settings of a computer system comply with STIG standards.

The scale of computer networks and the ever increasing need to provide additional cyber security for both enterprise information technology (IT) networks and mission systems is an increasing burden for cybersecurity teams. Establishing a risk based approach to improve cybersecurity by identifying the highest priority cyber risks to a designated mission, and then advising the appropriate leaders on strategies to resolve and mitigate known cyber vulnerabilities, or accept documented risks, is an area where industry can help mature capabilities. The delivery of cyber-compliant baselines and compliance evaluations that support a team's ability to manage and maintain key computer system configurations can be a valuable step in this process. The present technology improves cybersecurity by using STIG standards to evaluate a computer system configuration and determine whether the STIG standards are implemented on the computer system.

To further describe the present technology, examples are now provided with reference to the figures. FIG. 1 is a block diagram illustrating an example of a system 100 for obtaining, implementing, and determining compliance with STIG standards 104. As illustrated, the system 100 can include a STIG compliance service 130 hosted on one or more servers 102a. The STIG compliance service 130 provides automated management tools to compile STIG standards 104 based on security configuration rules and implement the STIG standards 104 on various computer systems 122a-c. A STIG standard 104 may be one or more configuration settings that are applicable to a system component 124a-c to prevent unauthorized access to a computer system 122a-c. Also, the STIG compliance service 130 provides automated management tools to generate configuration compliance packages used to maintain compliance with the STIG standards 104 implemented on the computer systems 122a-c. These automated management tools may be accessible to users via a user interface, such as a command line interface, a graphical user interface, and/or a web services interface.

The STIG compliance service 130 can include a plurality of modules 106/108/110 used to provide functionality related to creating security baselines that are based on STIG standards 104, generating configuration implementation packages 114 for deployment and implementation on computer systems 122a-c, and generating configuration compliance packages 116 used to maintain the security baselines on the computer systems 122a-c. Each of these functionalities is described below in relation to the modules 106/108/110.

Acquiring STIG Standards

The STIG compliance service 130 can include functionality for obtaining security configuration rules from data files (e.g., STIG files 112) and compiling STIG standards 104 extracted from the data files. As illustrated, the STIG compliance service 130 can include a STIG processing module 106 configured to obtain security configuration rules from one or more security technical implementation guides and compile STIG standards 104 directed to system components 124a-c installed on computer systems 122a-c based on the security configuration rules. In one example, STIG processing module 106 can be configured to obtain STIG files 112 containing security configuration rules and compile STIG standards 104 that are based on the security configuration rules contained in the STIG files 112.

In one example, the STIG files 112 can be obtained from one or more organizations and/or agencies that publish security technical implementation guides, such as the National Institute of Standards and Technology (NIST) and the Defense Information Systems Agency (DISA). These organizations may make their security technical implementation guides available to the public. For example, the STIG files 112 can be obtained from the National Vulnerability Database (NVD), which is a United States government repository of standards-based vulnerability management data. The NVD includes databases of security checklists, security related software flaws, misconfigurations, product names, impact metrics, etc. As can be appreciated, STIG files 112 can be obtained from other data sources that make STIG files available to the public.

The STIG files 112 can be stored within the system 100 (e.g., a data store located on a server 102b) in order to make the STIG files 112 accessible to the STIG processing module 106. A data source can distribute STIG files 112 using various file formats. In one example, a data source can distribute STIG standards as SCAP packages, each including a set of eXtensible Configuration Checklist Description Format (XCCDF) files. Illustratively, a SCAP package may be a zip file containing a defined set of files. XCCDF can be a file format of one such file that appears in a SCAP package. XML can be the language upon which XCCDF is based. XCCDF files can be human-readable checklists, detailing configuration rules, justifications, and instructions for compliance. SCAP packages can be used for policy compliance checking by formatting the SCAP packages to be consumed and used by automated tools, such as a SCAP Compliance Checker (SCC). In one example, CCI formatted XML files can be used to bridge a gap between high-level policy expressions and low-level technical implementations. CCI is a translation from unique identifiers applied by NIST to policy expressions, and the identifiers that DISA applies to technical guidance. NIST and DISA often do not agree on a single format standard. As such, a CCI List is maintained to translate between NIST and DISA formats and may be distributed as an XML file.

The STIG processing module 106 can be configured to process STIG files 112 to identify security configuration rules contained in the STIG files and correlate the security configuration rules to system components 124a-c included in computer systems 122a-c. For example, the STIG processing module 106 may cause a STIG file 112 to be parsed to identify individual security configuration rules specifying configuration settings for various system components 124a-c (e.g., operating systems, applications, programmable hardware, etc.) and correlate the security configuration rules to the system components 124a-c.

In one example, the STIG processing module 106 can be configured to decompose security configuration information in a STIG file 112 into individual security configuration rules directed to system components 124a-c of a computer system 122a-c, and the STIG processing module 106 can cause the security configuration rules to be simplified into STIG standards 104 that specify configuration settings for the system components 124a-c. As one example, security configuration rules contained in a SCAP format file can be condensed from a complex format into an intermediate format by (i) parsing the XCCDF and Open Vulnerability and Assessment Language (OVAL) components within the SCAP format file to identify security configuration rules, and (ii) identify how the security configuration rules should be applied based on protocol markers contained in the SCAP format file (e.g., correlate a security configuration rule to a system component 124a-c).

The intermediate format of a SCAP format file can be stored as individual STIG standards 104, or groups of related STIG standards 104, where the STIG standards 104 specify configuration settings for system components 124a-c of computer systems 122a-c. The stored STIG standards 104 can be made available to other modules included in the system 100 for the purpose of implementing the STIG standards 104 on computer systems 122a-c and monitor the computer systems 122a-c for compliance with the STIG standards 104, as described in more detail later.

Figure 2:
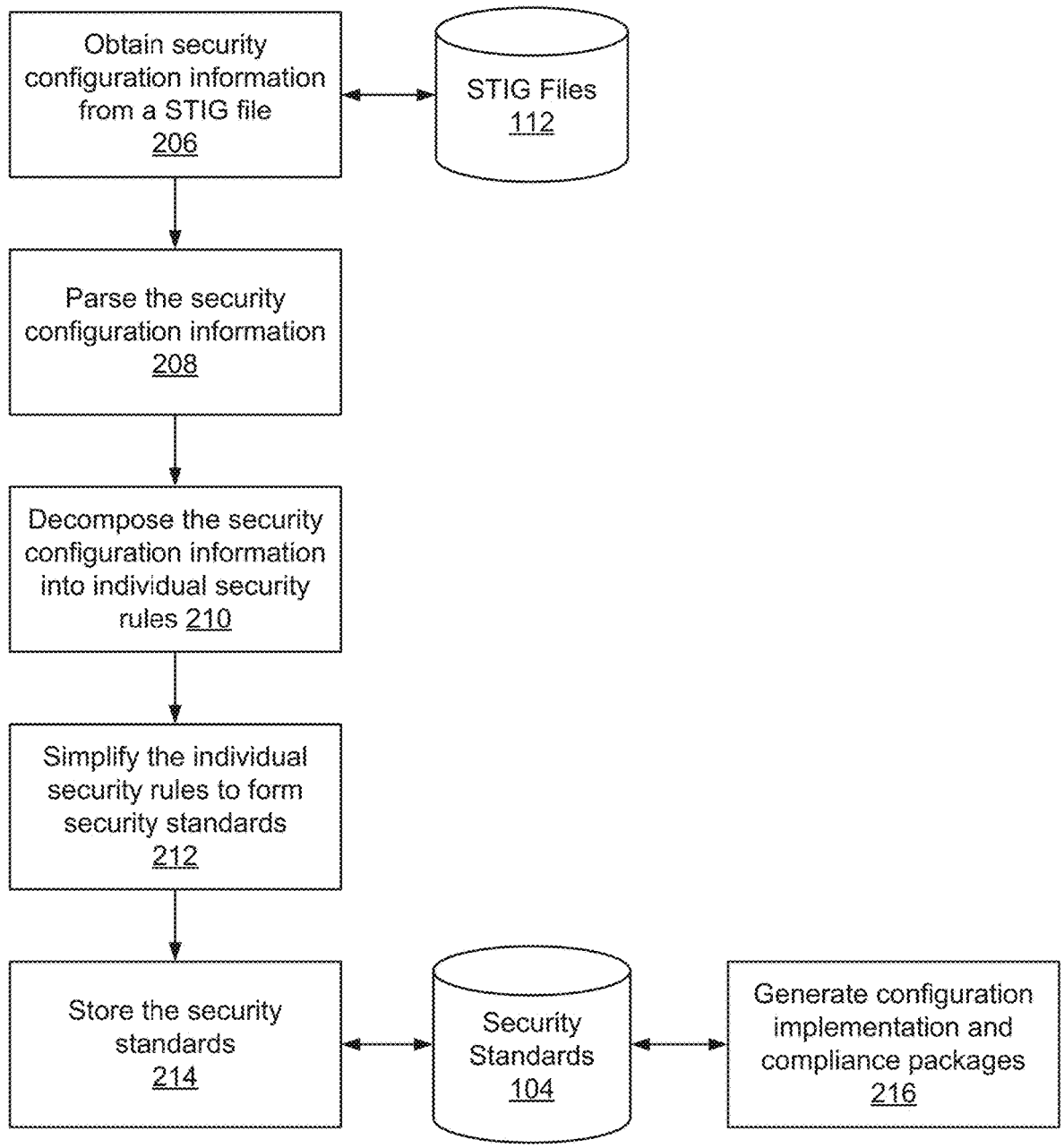
FIG. 2 is a flow diagram that illustrates an example method for decomposing and simplifying security configuration information obtained from STIG files.

The process of decomposing and simplifying security configuration information obtained from STIG files 112 is illustrated in FIG. 2. As shown in block 206, a STIG file 112 can be obtained from a data source that hosts STIG data files 112 (e.g., the National Vulnerability Database (NVD)). As in block 208, security configuration information obtained from the STIG file 112 can be parsed to identify individual security configuration rules which specify configuration settings for various system components, including operating systems, software applications, programmable hardware, and other system components that have configuration settings that can be modified. In one example, protocol markers contained in the STIG file 112 may delimit security configuration rules directed to system components. For example, a protocol marker may indicate that security configuration information in the STIG file 112 is directed to a particular type and version of operating system.

As in block 210, the security configuration information can be decomposed into the individual security configuration rules. For example, the individual security configuration rules identified in the security configuration information can be extracted from the security configuration information and stored to computer memory (e.g., RAM). Thereafter, as in block 212, the individual security rules can be simplified into security standards 104 to specify a system component and at least one configuration setting for the system component. As in block 214, the security standards 104 can be stored to a data store that is accessible to the STIG compliance service 130 to enable configuration implementation and compliance packages to be generated, as in block 216. The decomposition and simplification of security configuration information obtained from STIG files 112 into a format more readily usable in compliance checking and remediation allows for customization of STIG file content, while maintaining consistency in configuration and compliance of system components 124a-c included in computer systems 122a-c.

The process of obtaining STIG files 112 from publishers and compiling STIG standards 104 extracted from the STIG files 112 can be automated. For example, referring again to FIG. 1, the system 100 can include automated processes (not shown) that periodically query a data source that hosts STIG data files (e.g., the National Vulnerability Database (NVD)) for updated versions of STIG files 112 and request the updated versions of the STIG files 112 to be downloaded to a data store 132 accessible to the STIG compliance service 130. Thereafter, the STIG compliance service can initiate the STIG processing module 106 to extract STIG standards 104 from the updated versions of the STIG files 112 and store the STIG standards 104 in a data store 134 accessible to the other modules 108/110 included in the STIG compliance service 130.

Implementation of STIG Standards

The STIG compliance service 130 can include functionality for generating configuration implementation packages 114 used to implement STIG standards 104 on computer systems 122a-c. As illustrated, the STIG compliance service 130 can include a STIG configuration module 108. In one example, the STIG configuration module 108 can be configured to generate configuration implementation packages 114 directed to specific system components 124a-c of computer systems 122a-c. A configuration implementation package 114 can be an executable package or file that can be loaded into computer memory (e.g., random access memory (RAM) of a computer system 122a-c, and the configuration implementation package 114 can be executed by one or more processors of the computer system 122a-c. A configuration implementation package 114 can contain instructions (e.g., source code or bytecode) that, when executed by a processor, sets or modifies configuration values of one or more system components 124a-c to values specified by one or more STIG standards 104.

In one example, a configuration implementation package 114 may include instructions that set or modify configuration settings stored in an operating system registry to a value specified by a STIG standard 104. An operating system registry is a hierarchical database that stores low-level settings for an operating system and for applications that use the operating system registry, such as a kernel, device drivers, system services, a security accounts manager, or a user interface. In another example, a configuration implementation package 114 may include instructions that set or modify configuration settings stored in a configuration file (e.g., a config file and/or files that have .cnf, .conf, .cf, or .ini extensions) or another file type used to store configuration settings for a software application. In yet another example, a configuration implementation package 114 may include instructions that set or modify configuration settings stored in the computer memory of a programmable hardware component (e.g., basic input/output system (BIOS) firmware or field-programmable gate array (FPGA)).

The STIG configuration module 108, in one example, can be configured to generate a computer script that when executed on a computer system 122a-c sets a configuration setting for a system component 124a-c to a value specified by a STIG standard 104 associated with the system component 124a-c. Any appropriate scripting language can be used to create computer scripts that set configuration settings to values specified by STIG standards 104, including command scripts, PowerShell scripts, and other types of client-side scripts. The STIG configuration module 108 can be configured to generate one or more computer scripts for various STIG standards 104 and include the computer scripts in a configuration implementation package 114. When the configuration implementation package 114 is executed on a system computer 122a-c, the scripts included in the configuration implementation package 114 may be executed to update one or more system components 124a-c on the system computer 122a-c.

In one example, generating a configuration implementation package 114 can include creating a group policy object (GPO) that can be implemented on a computer system 122a-c that has an installed version of the MICROSOFT windows operating system (or another type of operating system that uses a form of group policy to control a working environment). A GPO can be used to control a working environment of a user account and computer account on a computer system 122a-c that runs the MICROSOFT windows operating system. The GPO can provide centralized management and configuration of the MICROSOFT windows operating system, applications, and user settings within in an active directory environment. For example, a GPO can be used to implement security policies, such as: enforce a password complexity policy that prevents users from choosing an overly simple password, allow or prevent unidentified users from connecting to network shared storage, block access or restrict access to certain directories, as well as other security policies. A security baseline can be deployed to a windows based computer system 122a-c using a GPO that includes configuration settings specified by STIG standards 104 that are directed to the windows operating system.

Figure 3:
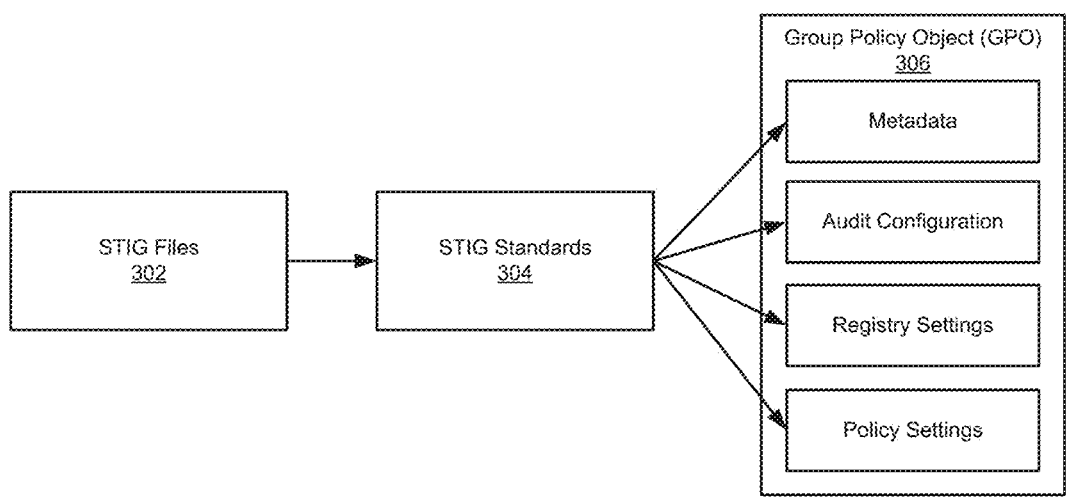
FIG. 3 is a block diagram that illustrates creating a group policy object using in part STIG standards to determine various configuration settings implemented via components of the group policy object.

The STIG configuration module 108 can be configured to create GPOs using in part the specifications of STIG standards 104 directed to the windows operating system. Referring to FIG. 3, an internal structure of a GPO 306 can be used to implement STIG standards 104. As an example, one or more STIG files 302 can be processed as described earlier to extract STIG standards 304 from the STIG files 302. A GPO 306 can then be created using the STIG standards 304 to determine various configuration settings implemented via the components of the GPO 306. For example, specifications of a STIG standard 304 that can be implemented using metadata included in the GPO 306 may be obtained and metadata may be generated to include a configuration setting specified by the STIG standard 304. Similarly, STIG standards 304 that can be implemented via registry settings, policy settings, and the like can be identified, and registry settings, policy settings, and other configuration settings included in the GPO can be set to values specified by the STIG standards 304. In the case that MICROSOFT adds or removes GPO features, the STIG standards 304 implemented via a GPO can be maintained on a computer system using the GPO.

Returning to FIG. 1, in one example, the STIG compliance service 130 may allow users, via a user interface, to request a configuration implementation package 114 for a specific computer system configuration, or for a specific system component 124*a-c*. For example, using a client computer 120, a user can select a system configuration from a list of system configurations, or the user can provide details for a system configuration, and the user can request a configuration implementation package 114 for the system configuration. As a specific example, a user can request a configuration implementation package 114 for a computer system 122*b-c* that has a version of MICROSOFT windows operating system and a version of MICROSOFT office application installed on the computer system 122*b-c*. In response to the request, the STIG compliance service 130 may instruct the STIG configuration module 108 to generate a configuration implementation package 114 for the computer system 122*b-c* that, when executed on the computer system 122*a-c*, implements configuration settings specified by STIG standards 104 directed to the versions of the MICROSOFT windows operating system and office application.

The STIG compliance service 130 can provide a configuration implementation package 114 generated by the STIG configuration module 108 to a client computer 120 by sending the configuration implementation package 114 over a network 118 to the client computer 120. The configuration implementation package 114 can then be deployed to the computer system 122*b-c*. In one example, the configuration implementation package 114 can be transferred from the client computer 120 to a network connected computer system 122*b*, and the configuration implementation package 114 can be executed on the computer system 122*b* to implement the configuration settings specified by the STIG standards 104 on the computer system 122*b*. In another example, the configuration implementation package 114 can be deployed to an air gapped computer 122*c* by transferring the configuration implementation package 114 from the client computer 120 to a portable storage medium 126 (e.g., a portable storage drive). The configuration implementation package 114 can then be transferred from the portable storage medium 126 to the air gapped computer 122*c*, and the configuration implementation package 114 can be executed on the air gapped computer 122*c* to implement the configuration settings specified by the STIG standards 104 on the air gapped computer 122*c*.

In another example, the STIG compliance service 130 can deploy a configuration implementation package 114 directly to a computer system 122*a* that is in network communication with the STIG compliance service 130. In one example, a user, via a client computer 120, can request that the STIG compliance service 130 generate a configuration implementation package 114 directed to one or more system components 124*a* located on the computer system 122*a* and deploy the configuration implementation package 114 to the computer system 122*a*. In response to receiving the configuration implementation package 114, the computer system 122*a* (e.g., a software client or agent located on the computer system 122*a*) may execute the configuration implementation package 114 to implement STIG standards 104 on the computer system 122*a*.

In yet another example, a software client or agent located on a computer system 122*a* may periodically send a request for a configuration implementation package 114 to the STIG compliance service 130. The request may include configuration specifications for the computer system 122*a* (e.g., specifications for system components 124*a* located on the computer system 122*a*). In response to receiving the request, the STIG compliance service 130 may instruct the STIG configuration module 108 to generate a configuration implementation package 114 based on the configuration specifications for the computer system 122*a*. The STIG compliance service 130 can send the configuration implementation package 114 to the computer system 122*a* and the software client or agent can execute the configuration implementation package 114 to implement STIG standards 104 directed to the configuration specifications of the computer system 122*a*.

Alternatively, STIG standards 104 directed to a configuration of a computer system 122*a-c* can be implemented remotely using the STIG compliance service 130. For example, the STIG compliance service 130 may be configured to identify STIG standards 104 which are directed to a configuration of a computer system 122*a-c*, and the STIG compliance service 130 may execute commands (e.g., remote procedure calls) that instruct the computer system 122*a-c* (e.g., a software client or agent located on the computer system 122*a-c*) to set or modify configuration settings of system components 124*a-c* to values specified by the STIG standards 104.

Evaluation of STIG Standard Compliance

The STIG compliance service 130 can include functionality for determining compliance with STIG standards 104 on computer systems 122*a-c*. As illustrated, the STIG compliance service 130 can include a STIG compliance module 110. In one example, the STIG compliance module 110 can be configured to generate a configuration compliance package 116 used to evaluate a configuration of a computer system 122*a-c* to determine whether the configuration of one or more system components 124*a-c* comply with STIG standards 104 directed to the system components 124*a-c*. The configuration compliance package 116 can be deployed to the computer system 122*a-c*, and the configuration compliance package 116 can be executed on the computer system 122*a-c* to evaluate the configuration settings of system components 124*a-c* for compliance with the STIG standards 104.

A configuration compliance package 116 may be an executable package or file that can be loaded into computer memory (e.g., random access memory (RAM) of a computer system 122*a-c*, and the configuration compliance package 116 can be executed by one or more processors of the computer system 122*a-c*. A configuration compliance package 116 can contain instructions (e.g., source code or bytecode) that, when executed by a processor, retrieves configuration values of one or more system components 124*a-c* and compares the configuration values to specifications of corresponding STIG standards 104. As one example, the instructions may query an operating system registry for a configuration value of a system component 124*a-c* (e.g., an operating system and/or a software application) and compare the configuration value of the system component 124a-c with a value specified by a STIG standard 104 directed to the system component 124a-c. As another example, the instructions may obtain configuration settings stored in a configuration file (e.g., a config file and/or files that have .cnf, .conf, .cf, or .ini extensions) or another file type used to store configuration settings for a system component 124a-c (e.g., a software application) and compare the configuration value with a value specified by a STIG standard 104 directed to the system component 124a-c. As yet another example, the instructions may obtain configuration settings stored in the computer memory of a programmable hardware component (e.g., basic input/output system (BIOS) firmware or field-programmable gate array (FPGA)) and compare the configuration value with a value specified by a STIG standard 104 directed to the programmable hardware component.

In one example, the STIG compliance module 110 can be configured to generate a computer script that when executed on a computer system 122a-c retrieves a configuration setting of a system component 124a-c and compares the value of the configuration setting with a value specified by a STIG standard 104 associated with the system component 124a-c. Also, one or more computer scripts can be generated to output a compliance report indicating whether the configuration setting of a computer system 122a-c comply with STIG standards 104. Any appropriate scripting language can be used to create the computer scripts that evaluate configuration settings for compliance with STIG standards 104 and generate compliance reports, including command scripts, PowerShell scripts, and other types of client-side scripts. The STIG compliance module 110 can be configured to generate the computer scripts and package the computer scripts in a configuration compliance package 116. When the configuration compliance package 116 is deployed to a system computer 122a-c, the computer scripts included in the configuration compliance package 116 can be executed on the system computer 122a-c.

The STIG compliance service 130 may allow users, via a user interface, to request a configuration compliance package 116 for a specific computer system configuration, or for a specific system component 124a-c. For example, a user, via a client computer 120, can select a system configuration from a list of system configurations (e.g., list of operating systems, software applications, etc.) or provide system configuration details (e.g., operating system type and version, software application type and version, etc.), and the user can request a configuration compliance package 116 for the system configuration. In response to the user request for the configuration compliance package 116, the STIG compliance service 130 may instruct the STIG compliance module 110 to create a configuration compliance package 116 to evaluate configuration settings of the system configuration specified by the user. The STIG compliance module 110 may be configured to identify STIG standards 104 directed to the system configuration specified by the user and generate instructions (e.g., one or more computer scripts) that evaluate the system configuration for compliance with the STIG standards 104. The instructions can be packaged into a configuration compliance package 116 file. As a specific example, a user may request a configuration compliance package 116 that evaluates configuration settings of the MICROSOFT windows operating system. In response to the request, the STIG compliance module 110 may identify STIG standards 104 directed to the windows operating system and generate the configuration compliance package 116 for the computer system 122b-c that, when executed on the computer system 122a-c, queries the windows operating system registry for configuration settings and compares the configuration settings with the STIG standards 104 directed to the windows operating system.

The STIG compliance service 130 can output a configuration compliance package 116 generated by the STIG compliance module 110 to allow deployment of the configuration compliance package on a computer system 122a-c to determine compliance of configuration settings of system components 124a-c with STIG standards 104. In one example, a configuration compliance package 116 can be provided to a security compliance auditing system 140 that uses the configuration compliance package 116 to remotely scan computer systems 122a-c for compliance with STIG standards 104. The security compliance auditing system 140 can be commercially available software that can be hosted on one or more servers 102c located in a customer data center or within a service provider environment (e.g., a "Cloud" environment). The configuration compliance package 116 can be formatted to conform to requirements of the security compliance auditing system 140, enabling the security compliance auditing system 140 to interpret and/or execute the instructions contained in the configuration compliance package 116.

In another example, the STIG compliance service 130 can output a configuration compliance package 116 to a client computer 120 used to distribute the configuration compliance package 116 to other computing systems 122b-c. The STIG compliance service 130 can send the configuration compliance package 116 over a network 118 to the client computer 120. The configuration compliance package 116 can then be deployed to a computer system 122b-c to evaluate configuration settings of system components 124b-c located on the computer system 122b-c. In one example, the configuration compliance package 116 can be transferred from the client computer 120 to a network connected computer system 122b, and the configuration compliance package 116 can be executed on the computer system 122b to implement the configuration settings specified by the STIG standards 104 on the computer system 122b. In another example, the configuration compliance package 116 can be deployed to an air gapped computer 122c by transferring the configuration compliance package 116 from the client computer 120 to a portable storage medium 126 (e.g., a portable storage drive). The configuration compliance package 116 can then be transferred from the portable storage medium 126 to the air gapped computer 122c, and the configuration compliance package 116 can be executed on the air gapped computer 122c to evaluate the configuration settings of system components 124c for compliance to STIG standards 104.

In another example, the STIG compliance service 130 can deploy a configuration compliance package 116 directly to a computer system 122a that is in network communication with the STIG compliance service 130. In one example, a user, via a client computer 120, can request that the STIG compliance service 130 generate a configuration compliance package 116 directed to one or more system components 124a located on the computer system 122a and deploy the configuration compliance package 116 to the computer system 122a. In response to receiving the configuration compliance package 116, the computer system 122a (e.g., a software client or agent located on the computer system 122a) may execute the configuration compliance package 116 to evaluate the configuration settings of system components 124a for compliance to STIG standards 104.

In yet another example, a software client or agent located on a computer system 122a may periodically send a request for a configuration compliance package 116 to the STIG compliance service 130. The request may include configuration specifications for the computer system 122a (e.g., specifications for system components 124a located on the computer system 122a). In response to receiving the request, the STIG compliance service 130 may instruct the STIG compliance module 110 to generate a configuration compliance package 116 based on the configuration specifications for the computer system 122a. The STIG compliance service 130 can send the configuration compliance package 116 to the computer system 122a and the software client or agent can execute the configuration compliance package 116 to evaluate the configuration settings of system components 124a for compliance to STIG standards 104 and report back to the STIG compliance service 130 whether the configuration settings are in compliance with the STIG standards 104.

License Compliance

The STIG compliance service 130 can be used to enforce software license terms in non-connected, resource-constrained operational environments using an independently verifiable file to identify an intended licensee and configure end-point software under the terms of a purchased license. In particular, the STIG compliance service 130 can be used to deploy licensed system components 122c to air-gapped computer systems 122c and evaluate compliance with license terms for the system components 124c. In one example, the STIG compliance service 130 can include a license generator module 136 configured to generate a license file using a private key to sign arbitrary license-term information with the private key. The STIG compliance service 130 can include a cryptographic algorithm library 138. The cryptographic algorithm library 138 can include any appropriate cryptographic algorithm. The license generator module 136 can select a cryptographic algorithm included in the cryptographic algorithm library 138 to use to encrypt the license file. The license file can bound to a software component installation (e.g., included in an installation package). Thereafter, a software component installation package that includes the license file can be deployed to an air-gapped computer system 122c.

An end-point installation of the software component installation package can validate that the license term information has not been tampered with using a public key that corresponds to the private key used to sign the license term information. For example, a software installer (e.g., a soft client or agent) can obtain the license file from the software component installation package and decrypt the license file. The software installer can then install the system component 124c on the air-gapped computer system 122c according to the license file.

API calls, procedure calls or other network commands that may be made in relation to the STIG compliance service 130, modules 106/108/110, computer systems 122a-c, and client computer 120 included in the system 100 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

A client computer 120 may comprise a processor and memory based system. A client computer 120 may be a device such as, but not limited to, a desktop computer, laptop or notebook computer, workstation, network computer, tablet computer, mobile device, or other computing devices with like capability.

The various processes and/or other functionality contained within the system 100 may be executed on one or more processors that are in communication with one or more memory modules. The system 100 may include a number of computing devices that are arranged, for example, in one or more server banks or computer banks or other arrangements. The computing devices may support a computing environment using hypervisors, virtual machine monitors (VMMs) and other virtualization software. The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

The network 118 may include any useful computing network, including an intranet, the Internet, a local area network, a wide area network, a wireless data network, or any other such network or combination thereof. Components utilized for such a system may depend at least in part upon the type of network and/or environment selected. Communication over the network may be enabled by wired or wireless connections and combinations thereof.

FIG. 1 illustrates that certain processing modules may be discussed in connection with this technology and these processing modules may be implemented as computing services. In one example configuration, a module may be considered a service with one or more processes executing on a server or other computer hardware. Such services may be centrally hosted functionality or a service application that may receive requests and provide output to other services or consumer devices. For example, modules providing services may be considered on-demand computing that are hosted in a server, virtualized service environment, grid or cluster computing system. An API may be provided for each module to enable a second module to send requests to and receive output from the first module. Such APIs may also allow third parties to interface with the module and make requests and receive output from the modules. While FIG. 1 illustrates an example of a system that may implement the techniques above, many other similar or different environments are possible. The example environments discussed and illustrated above are merely representative and not limiting.

Figure 4:
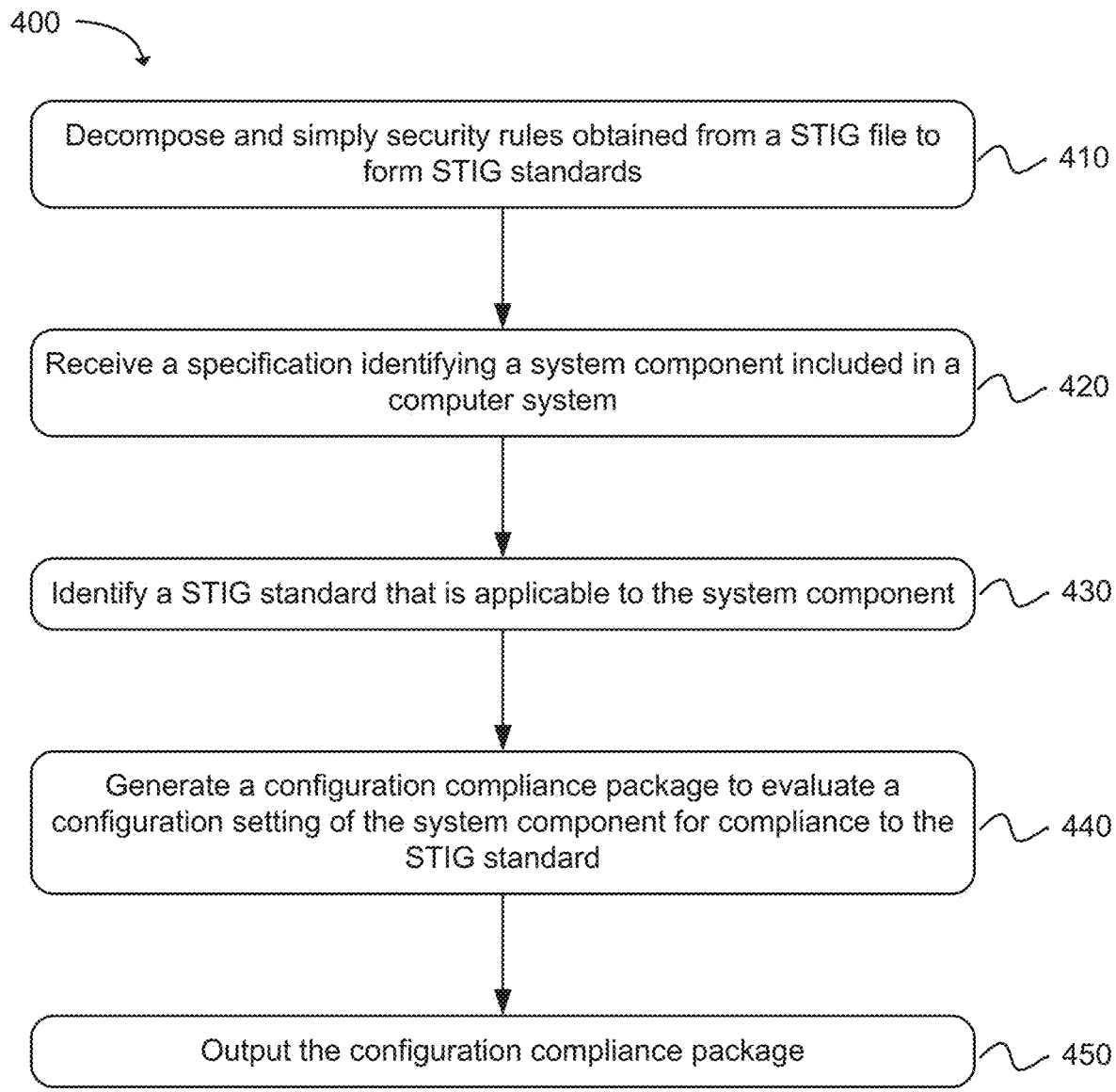
FIG. 4 is a flow diagram illustrating an example method for determining compliance with STIG standards.

Moving now to FIG. 4, a flow diagram illustrates an example method for determining compliance with security technical implementation guide (STIG) standards. As in block 410, security rules can be obtained from a STIG file and the security rules can be decomposed and simplified to form STIG standards. As an example, a STIG file can be obtained from a STIG source, such as from an entity which publishes security technical implementation guides. The STIG file can include one or more of: an extensible configuration checklist description format (XCCDF) file, a security content automation protocol (SCAP) file, or a control correlation identifier (CCI) extensible markup language (XML) file. The STIG file obtained from the STIG source can contain STIG specifications for security rules used to secure computer systems against unauthorized access. The security rules may be directed to a plurality of system components included in computer systems, including, but not limited to, an operating system, a software application, firmware, programmable computer hardware, or other types of system components.

The security standards specified in the STIG file can be correlated to system components, and STIG standards can be generated for the system components using configuration settings specified by the security standards. For example, the STIG file can be parsed to identify a security standard specification associated with a specific computer system. The security standard specification can include information that identifies a system component of a computer system and a recommended configuration setting for the system component. The security standard specification can be extracted from the data file, and the security standard specification can be formatted to form a STIG standard that indicates the recommended configuration setting of the system component.

STIG standards can be used to generate configuration compliance packages used to evaluate computer systems for compliance to the STIG standards. A configuration compliance package can be generated to evaluate configuration settings of specific system components included in a computer system. For example, a STIG compliance service may receive requests for configuration compliance packages. As in block 420, a request for a configuration compliance package may include a specification identifying a system component included in a computer system.

As in block 430, in response to the request for the configuration compliance package, a STIG standard that is applicable to the system component can be identified. As in block 440, a configuration compliance package can be generated to evaluate a configuration setting of the system component for compliance to the STIG standard. In one example, the configuration compliance package can be generated to include a computer script that initiates execution of a task on the computer system to evaluate the configuration setting and determine whether a value of the configuration setting corresponds to the STIG standard. Also, the configuration compliance package can be generated to output an indication whether a configuration setting complies with a STIG standard included in the set of STIG standards.

As in block 450, the STIG compliance service may output the configuration compliance package to enable a determination of compliance of the configuration setting with the STIG standard. In one example, the configuration compliance package can be deployed to one or more computer systems where the configuration compliance package can be executed. In one example, the configuration compliance package can be transferred over a computer network to a computing device that hosts the computer system. In another example, the configuration compliance package can be loaded onto an external storage device and the configuration compliance package can be transferred from the external storage device to a computing device that hosts the computer system. For example, the configuration compliance package can be sent over a computer network to a client computing device to enable the transfer of the configuration compliance package to the external storage device. In some examples, the configuration compliance package can be stored on a storage device (e.g., a configuration compliance package library) to allow the configuration compliance package to be used at a later time to perform evaluations of computer systems for compliance with the STIG standard.

In one example, the STIG compliance service can be configured to generate a configuration implementation package which can be used to implement at least a portion of the STIG standards on a computing system by updating configuration settings for a system component to values indicated by the STIG standards. For example, the configuration implementation package can include one or more computer scripts that are configured to update the configuration settings of a system component to comply with a STIG standard directed to the system component. In some examples, as part of performing a compliance evaluation using a configuration compliance package, configuration settings of system components determined to be out of compliance can be updated to comply with STIG standards directed to the system components using computer scripts included in a configuration implementation package.

Figure 5:
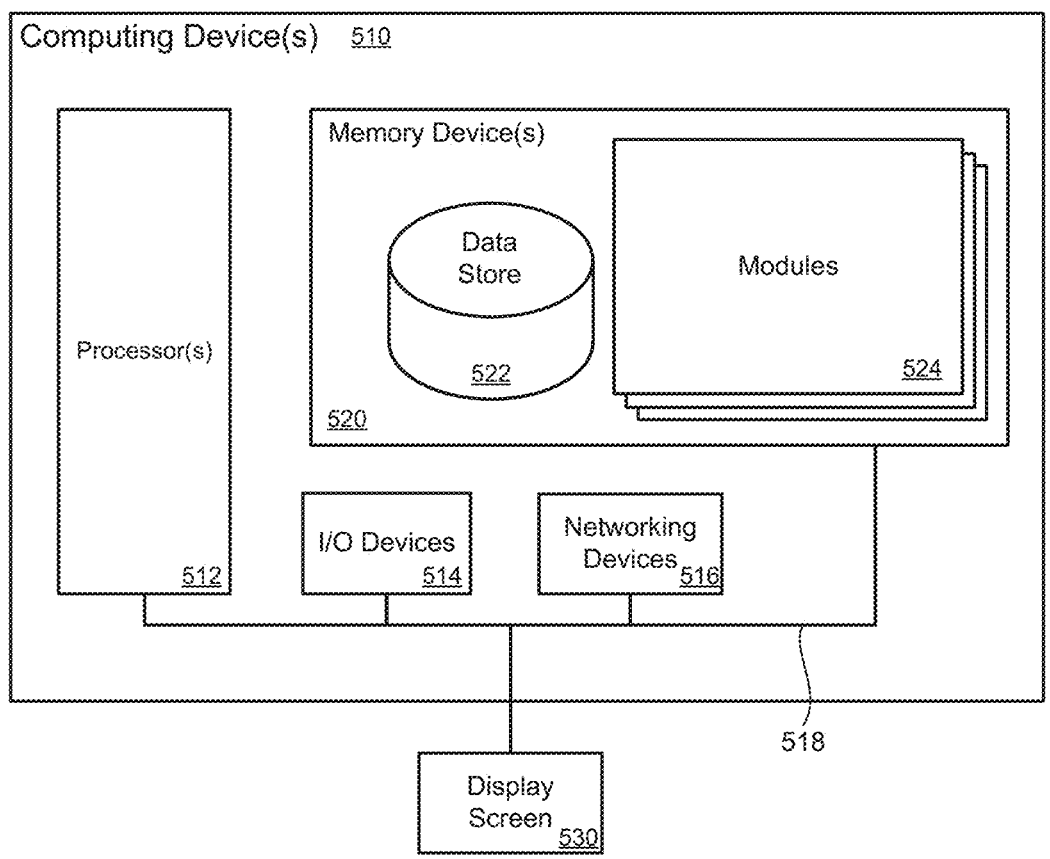
FIG. 5 is a block diagram that illustrates an example of a computing device that may be used to execute a method for determining compliance with STIG standards.

FIG. 5 illustrates a computing device 510 on which modules of this technology can execute. A computing device 510 is illustrated on which a high level example of the technology can be executed. The computing device 510 can include one or more processors 512 that are in communication with memory devices 520. The computing device 510 can include a local communication interface 518 for the components in the computing device. For example, the local communication interface 518 can be a local data bus and/or any related address or control busses as may be desired.

The memory device 520 can contain modules 524 that are executable by the processor(s) 512 and data for the modules 524. In one example, the memory device 520 can include an operating system module, a user interface (UI) module, a STIG processing module, a STIG configuration module, a STIG compliance module, a license generator module, and other modules. The modules 524 can execute the functions described earlier. A data store 522 can also be located in the memory device 520 for storing data related to the modules 524 and other applications along with an operating system that is executable by the processor(s) 512.

Other applications can also be stored in the memory device 520 and may be executable by the processor(s) 512. Components or modules discussed in this description that can be implemented in the form of software using high-level programming languages that are compiled, interpreted or executed using a hybrid of the methods.

The computing device can also have access to I/O (input/output) devices 514 that are usable by the computing devices. One example of an I/O device can include a display screen 530, such as a touchscreen. Networking devices 516 and similar communication devices can be included in the computing device. The networking devices 516 can be wired or wireless networking devices that connect to the internet, a LAN, WAN, or other computing network.

The components or modules that are shown as being stored in the memory device 520 can be executed by the processor(s) 512. The term "executable" can mean a program file that is in a form that can be executed by a processor 512. For example, a program in a higher level language can be compiled into machine code in a format that can be loaded into a random access portion of the memory device 520 and executed by the processor 512, or source code can be loaded by another executable program and interpreted to generate instructions in a random access portion of the memory to be executed by a processor. The executable program can be stored in any portion or component of the memory device 520. For example, the memory device 520 can be random access memory (RAM), read only memory (ROM), flash memory, a solid state drive, memory card, a hard drive, optical disk, floppy disk, magnetic tape, or any other memory components.

The processor 512 can represent multiple processors and the memory device 520 can represent multiple memory units that operate in parallel to the processing circuits. This can provide parallel processing channels for the processes and data in the system. The local communication interface 518 can be used as a network to facilitate communication between any of the multiple processors and multiple memories. The local communication interface 518 may use additional systems designed for coordinating communication such as load balancing, bulk data transfer and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions and may even be distributed over several different code segments, among different programs and across several memory devices. Similarly, operational data may be identified and illustrated herein within modules and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, a non-transitory machine readable storage medium, such as RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example and not limitation, communication media includes wired media such as a wired network or direct-wired connection and wireless media such as acoustic, radio frequency, infrared and other wireless media. The term computer readable media as used herein includes communication media.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A system for determining compliance with security technical implementation guide (STIG) standards, comprising:
   at least one processor; and
   a memory device including instructions that, when executed by the at least one processor, cause the system to:
   analyze a STIG data file obtained from a STIG publisher to identify protocol markers in the STIG data file that delimit individual security configuration rules directed to system components of a computer system configuration;
   extract the individual security configuration rules from the STIG data file identified using the protocol markers;
   reduce each of the individual security configuration rules to a STIG standard that identifies a system component of the computer system configuration and specifies at least one configuration setting for the system component;

generate a configuration compliance package to evaluate the at least one configuration setting of the system component for compliance to the STIG standard;

output the configuration compliance package to enable a determination of compliance of the at least one configuration setting with the STIG standard; and generate a configuration implementation package comprising a group policy object ("GPO") operable to be implemented on the system component, the GPO controlling a working environment of a user account and a computer account on the system component.

2. The system of claim 1, wherein the configuration compliance package is configured to execute on a computer system having the computer system configuration and compare the at least one configuration setting with the STIG standard.

3. The system in claim 1, wherein the memory device further includes instructions that, when executed by the at least one processor, cause the system to:

generate a computer script to initiate execution of a task on the computer system configuration to evaluate the at least one configuration setting and determine whether a value of the at least one configuration setting corresponds to the STIG standard; and generate the configuration compliance package to include the computer script.

4. The system in claim 1, wherein the memory device further includes instructions that, when executed by the at least one processor, cause the system to generate the configuration compliance package to output a compliance report indicating whether the configuration setting complies with the STIG standard.

5. The system in claim 1, wherein the configuration compliance package is loaded onto a portable storage medium and the configuration compliance package is transferred from the portable storage medium to a computing device that hosts the computer system configuration.

6. The system in claim 1, wherein the configuration compliance package is transferred over a computer network to a computing device that hosts the computer system configuration.

7. The system of claim 1, wherein the GPO is operable to provide centralized management and configuration of an operating system on the computer system, and wherein the GPO implements security policies comprising at least one of password complexity enforcement, prevention of unidentified users from connecting to a network shared storage, or restriction of access to predetermined directories.

8. A computer implemented method for determining compliance with security technical implementation guide (STIG) standards, comprising:

analyzing a STIG data file obtained from a STIG publisher to identify protocol markers in the STIG data file that delimit individual security configuration rules directed to system components of a computer system configuration;

extracting the individual security configuration rules from the STIG data file identified using the protocol markers;

reducing each of the individual security configuration rules to a STIG standard that identifies a system component of the computer system configuration and specifies at least one configuration setting for the system component;

receiving a request for a configuration compliance package to evaluate configuration settings of the system component for compliance with the STIG standard;

generating the configuration compliance package to evaluate the at least one configuration setting of the system component for compliance with the STIG standard;

outputting the configuration compliance package to enable a determination of compliance of the at least one configuration setting with the STIG standard;

generating a configuration implementation package used to implement at least a portion of the STIG standards, the configuration implementation package comprising a group policy object ("GPO") operable to be implemented on the system component, the GPO controlling a working environment of a user account and a computer account on the system component; and updating configuration settings for the system component to values indicated by the GPO.

9. The method in claim 8, wherein the STIG data file includes one or more of an extensible configuration checklist description format (XCCDF) file, a security content automation protocol (SCAP) file, or a control correlation identifier (CCI) extensible markup language (XML) file.

10. The method in claim 8, wherein generating the configuration compliance package further comprises generating a computer script for the STIG standard to initiate execution of a task on the computer system configuration to evaluate a configuration setting related to the STIG standard and determine whether the configuration setting complies with the STIG standard.

11. The method in claim 8, wherein generating the configuration compliance package further comprises generating the configuration compliance package to output an indication whether a configuration setting complies with the STIG standard.

12. The method in claim 8, wherein outputting the configuration compliance package further comprises providing the configuration compliance package for transfer to an external storage device to allow the configuration compliance package to be loaded onto a computing device that hosts the system component.

13. The method in claim 12, wherein outputting the configuration compliance package for transfer to the external storage device further comprises sending the configuration compliance package over a computer network to a client computing device to enable the transfer of the configuration compliance package to the external storage device.

14. The method in claim 8, wherein outputting the configuration compliance package further comprises sending the configuration compliance package over a computer network to a client computing device that hosts the system component to allow the configuration compliance package to be executed on the client computing device.

15. The method in claim 8, wherein the system component included in the computer system configuration includes: an operating system, a software application, firmware, or programmable computer hardware.

16. A non-transitory machine readable storage medium including instructions embodied thereon for a security compliance service, wherein the instructions, when executed by at least one processor:

obtain a data file associated with a security technical implementation guide (STIG) containing specifications for security standards used to secure computer systems against unauthorized access;

analyze the data file to identify protocol markers in the STIG data file that delimit the specifications for security standards into individual security configuration rules directed to system components of a computer system configuration;

extract the individual security configuration rules from the STIG data file identified using the protocol markers;

reduce each of the individual security configuration rules to a STIG standard that identifies a system component of the computer system configuration and specifies at least one configuration setting for the system component;

receive a request for a configuration compliance package intended for the computer system configuration;

generate the configuration compliance package to evaluate the computer system configuration for compliance to the STIG standard associated with the computer system configuration;

output the configuration compliance package to enable a determination of compliance of the computer system configuration with the STIG standard; and generate a configuration implementation package comprising a group policy object ("GPO") operable to be implemented on the computer systems, the GPO controlling a working environment of a user account and a computer account on the computer systems.

17. The non-transitory machine readable storage medium in claim 16, wherein the configuration compliance package contains a plurality of computer scripts configured to initiate task on the computer system configuration to evaluate the at least one configuration setting of the system component and determine whether the at least one configuration setting corresponds to the STIG standard.

18. The non-transitory machine readable storage medium in claim 16, wherein the security compliance service is a web application configured to provide configuration compliance packages to client devices.

19. The non-transitory machine readable storage medium in claim 16, wherein the request for the configuration compliance package is received at an application programming interface (API) configured to provide client devices with an interface to the security compliance service.

* * * * *